(12) United States Patent  
Rösel

(10) Patent No.: US 8,297,040 B2
(45) Date of Patent: Oct. 30, 2012

(54) DIAGNOSTIC METHOD AND DEVICE FOR OPERATING AN INTERNAL COMBUSTION ENGINE

(75) Inventor: Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 405 days.

(21) Appl. No.: 12/524,750

(22) PCT Filed: Feb. 4, 2008

(86) PCT No.: PCT/EP2008/051362
§ 371 (c)(1),
(2), (4) Date: Jul. 28, 2009

(87) PCT Pub. No.: WO2008/095906
PCT Pub. Date: Aug. 14, 2008

(65) Prior Publication Data
US 2010/0089033 A1    Apr. 15, 2010

(30) Foreign Application Priority Data

Feb. 5, 2007  (DE) .................. 10 2007 005 684

(51) Int. Cl.
*F01N 3/18*      (2006.01)
(52) U.S. Cl. .............. 60/277; 60/274; 60/276; 60/286; 60/295; 60/301
(58) Field of Classification Search .......... 60/273, 60/276, 277, 286, 295, 301, 303, 274
See application file for complete search history.

(56) References Cited

U.S. PATENT DOCUMENTS
6,216,448 B1   4/2001  Schnaibel et al.
(Continued)

FOREIGN PATENT DOCUMENTS
DE   19801625 A1   7/1999
(Continued)

OTHER PUBLICATIONS
International Search Report, PCT/EP2008/051362, 10 pages, May 13, 2008.
German Office Action, German Application 10 2007 005 684.4-26, 8 pages, Jul. 18, 2007.

*Primary Examiner* — Kenneth Bomberg
*Assistant Examiner* — Jorge Leon, Jr.
(74) *Attorney, Agent, or Firm* — King & Spalding L.L.P.

(57) ABSTRACT

An internal combustion engine has an exhaust gas catalyst, a first exhaust gas sensor that is arranged in such a manner that it can be used in lambda control, and a second exhaust gas sensor that is arranged in such a manner that it can be used in trim control. A HC quality value (EFF_CAT_HC) which is representative of an oxygen storage capacity of the exhaust gas catalyst is determined depending on a measuring signal (VLS_DOWN) of the second exhaust gas sensor. A NOx correction factor (COR_NOX) is determined depending on the measuring signal (VLS_DOWN) of the second exhaust gas sensor, namely depending on signal portions that are representative of the residual oxygen. A NOx quality value (EFF_CAT_DIAL_NOX) is determined depending on the HC quality value (EFF_CAT_HC) and the NOx correction factor (COR_NOX).

16 Claims, 3 Drawing Sheets

U.S. PATENT DOCUMENTS

| | | |
|---|---|---|
| 7,431,025 B2 | 10/2008 | Roesel et al. |
| 2002/0102190 A1* | 8/2002 | Rosel et al. .................. 422/168 |
| 2002/0152745 A1* | 10/2002 | Patchett et al. ................ 60/286 |
| 2003/0221415 A1* | 12/2003 | Rosel et al. .................... 60/277 |
| 2004/0000135 A1 | 1/2004 | Uchida |
| 2005/0166578 A1* | 8/2005 | Pohmerer et al. ............... 60/285 |
| 2005/0252196 A1* | 11/2005 | Aliakbarzadeh et al. ....... 60/277 |
| 2006/0157037 A1* | 7/2006 | Rosel ........................... 123/687 |
| 2008/0022987 A1 | 1/2008 | Roesel et al. |

FOREIGN PATENT DOCUMENTS

| | | |
|---|---|---|
| DE | 19953601 A1 | 5/2001 |
| DE | 10330367 A1 | 3/2005 |
| DE | 102005045888 B3 | 9/2006 |
| DE | 102005007830 A1 | 8/2008 |

* cited by examiner

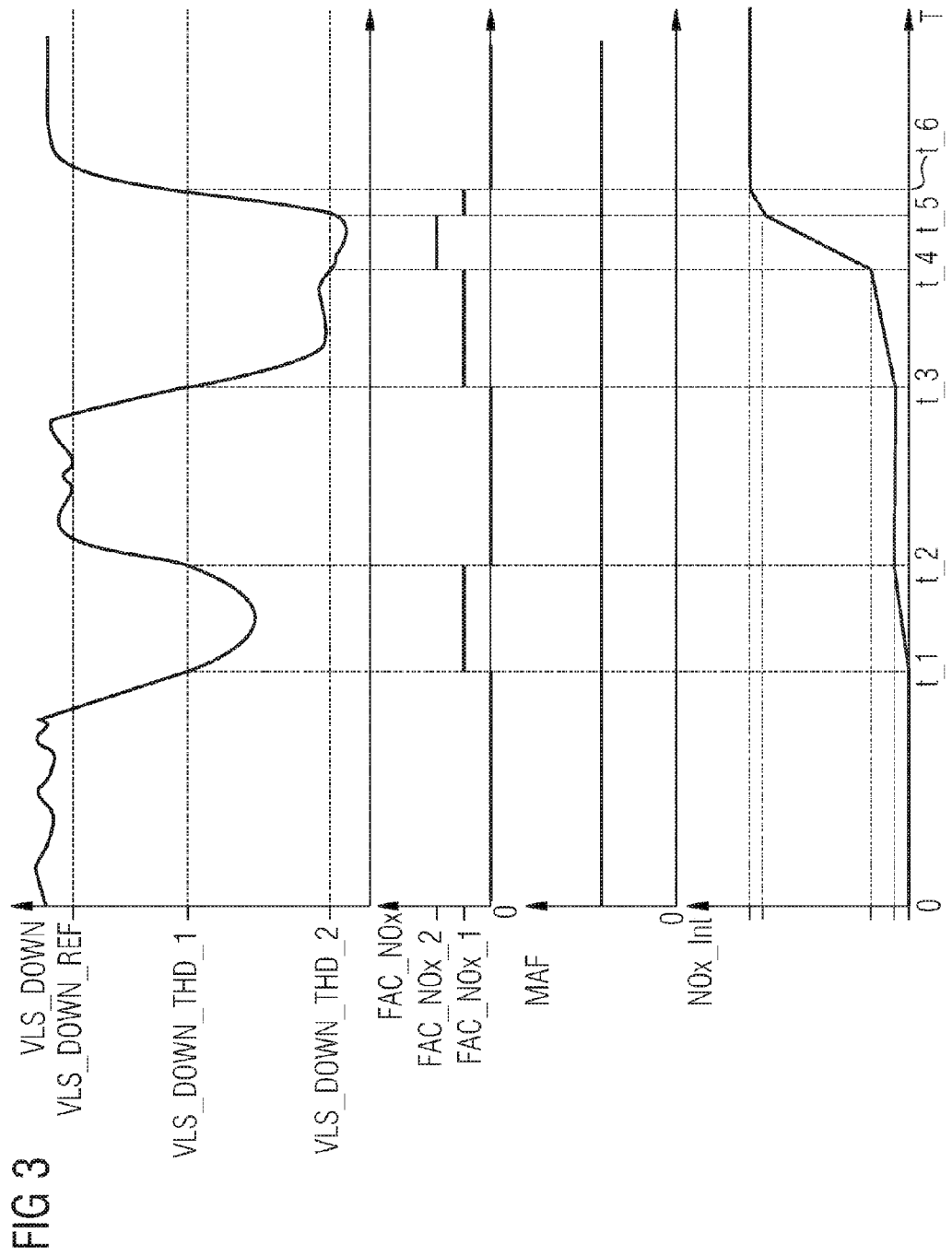

DIAGNOSTIC METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2008/051362 filed Feb. 4, 2008, which designates the United States of America, and claims priority to German Application No. 10 2007 005 684.4 filed Feb. 5, 2007, the contents of which are hereby incorporated by reference in their entirety.

TECHNICAL FIELD

The invention relates to a method and a device for operating an internal combustion engine comprising a catalytic converter, a first exhaust gas sensor that is disposed in such a way that it may be used in a lambda closed-loop control operation, and a second exhaust gas sensor that is disposed in such a way that it may be used in a trim closed-loop control operation.

BACKGROUND

Increasingly strict statutory regulations regarding admissible pollutant emissions of motor vehicles, in which internal combustion engines are disposed, make it necessary to keep the pollutant emissions during operation of the internal combustion engine as low as possible. This may be done firstly by reducing the pollutant emissions that arise during combustion of the air-fuel mixture in the respective cylinders. Secondly, in internal combustion engines use is made of exhaust gas after-treatment systems, by means of which the pollutant emissions produced during the process of combustion of the air-fuel mixture in the respective cylinder are converted into harmless substances. Especially in gasoline internal combustion engines, three-way catalytic converters are used as catalytic converters. A prerequisite of highly efficient conversion of the pollutant components, such as carbon monoxide (CO), hydrocarbons (HC) and nitrous oxides (Nox), is a precisely adjusted air-fuel ratio in the cylinders.

Furthermore, the composition of the mixture upstream of the catalytic converter has to exhibit a defined variation and so a purposeful operation of the internal combustion engine both with excess air and with an air deficiency is necessary in order to achieve filling and emptying of an oxygen store of the catalytic converter. With the storing of oxygen in the oxygen store nitrous oxides in particular are reduced, while with emptying of the oxygen store the oxidation is assisted and a deactivation of sub-regions of the catalytic converter by stored oxygen molecules is further prevented.

The oxygen store is inter alia also designed to store oxygen over a very short term and, where necessary, to bind or release this oxygen. The oxygen store comprises a surface store and a sub-surface store for the storage of oxygen.

From the technical manual "Internal Combustion Engine Manual", edited by Richard von Basshuysen/Fred Schäfer, $2^{nd}$ edition, June 2002, Friedrich Vieweg and Sohn Verlaggesellschaft mbH Braunschweig/Wiesbaden, pp. 559-561, a lambda closed-loop control operation and an associated trim closed-loop control operation for gasoline-operated internal combustion engines is known. By means of the lambda closed-loop control operation it is to be ensured that the pollutant components CO, HC and NOx are converted as efficiently as possible, namely in connection with the use of a catalytic converter in the form of a three-way catalytic converter.

The lambda closed-loop control operation comprises the modulation of a forced excitation upon a setpoint value of the air-fuel ratio in order to optimize the catalytic converter efficiency. In dependence upon the signal of a linear lambda sensor upstream of the catalytic converter an actual value of the air-fuel ratio is determined and so a system deviation is determined for the lambda controller, which takes the form of a $PII^2D$ controller and at the output of which a correction value for correcting a fuel quantity to be metered is determined. The fuel quantity to be metered that is corrected by means of the correction value is apportioned by the fuel injection valves into the combustion chambers of the cylinders.

The trim controller takes the form of a PI controller, which utilizes the signal of the sensor downstream of the catalyst that is subject to less cross sensitivity.

From the same technical manual, pp. 568 ff., it is known to monitor the catalytic converter. For this purpose, the oxygen storage capacity of the catalytic converter is utilized, which correlates with the hydrocarbon conversion in the catalytic converter. For a catalytic converter diagnosis an increased forced excitation is used. In a new catalytic converter with a relatively high oxygen storage capacity, these control oscillations are markedly damped and so the sensor signal downstream of the catalytic converter has only a low oscillation amplitude. An aged catalytic converter has markedly poorer storage properties, with the result that the oscillation upstream of the catalytic converter has a correspondingly greater impact on the exhaust gas sensor downstream of the catalytic converter. To monitor the catalytic converter, therefore, the signal amplitudes of the lambda sensors upstream and downstream of the catalytic converters are evaluated and then the quotient of the amplitudes is formed. This amplitude ratio is used to assess the conversion rate of the catalytic converter.

An increasingly frequent requirement is also to carry out monitoring with regard to possible nitrous oxide emissions and in particular also to estimate the NOx emissions.

SUMMARY

According to various embodiments, a method and a device for operating an internal combustion engine can be provided, by means of which an easy estimation of NOx emissions is possible.

According to an embodiment, a method of operating an internal combustion engine comprising a catalytic converter, a first exhaust gas sensor that is disposed in such a way that it may be used in a lambda closed-loop control operation, and a second exhaust gas sensor that is disposed in such a way that it may be used in a trim closed-loop control operation, may comprise the steps of:—determining an HC quality value that is representative of an oxygen storage capacity of the catalytic converter in dependence upon a measuring signal of the second exhaust gas sensor,—determining a NOx correction value in dependence upon the measuring signal of the second exhaust gas sensor, namely in dependence upon signal components that are representative of the presence of residual oxygen, and—determining an NOx quality value in dependence upon the HC quality value and the NOx correction value.

According to a further embodiment, in dependence upon the NOx quality value and a preselected NOx quality limit value a diagnosis indicator can be determined.

According to another embodiment, a device for operating an internal combustion engine may comprise a catalytic converter, a first exhaust gas sensor that is disposed in such a way that it may be used in a lambda closed-loop control operation, and a second exhaust gas sensor that is disposed in such a way that it may be used in a trim closed-loop control operation, wherein the device may be designed—to determine an HC quality value, which is representative of an oxygen storage capacity of the catalytic converter, in dependence upon a measuring signal of the second exhaust gas sensor,—to determine a NOx correction value in dependence upon the measuring signal of the second exhaust gas sensor, namely in dependence upon signal components that are representative of the presence of residual oxygen, and—to determine a NOx quality value in dependence upon the HC quality value and the NOx correction value.

BRIEF DESCRIPTION OF THE DRAWINGS

There now follows a detailed description of exemplary embodiments with reference to the diagrammatic drawings, in which.

Constructionally or functionally identical elements are denoted by the same reference characters in all of the figures.

DETAILED DESCRIPTION

Figure 1:
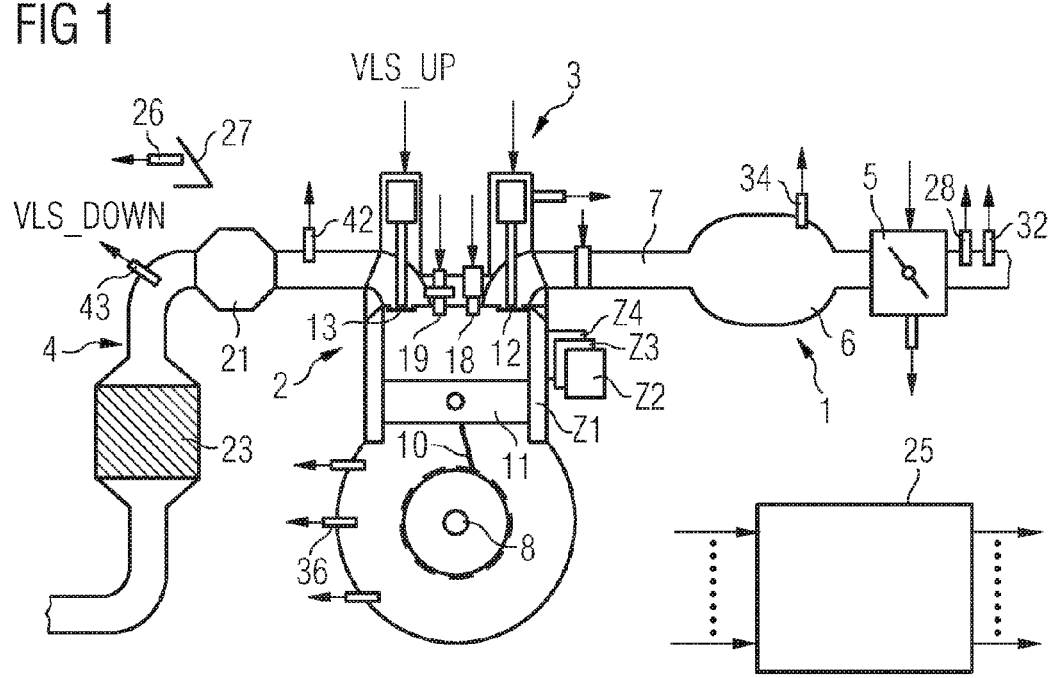
FIG. 1 an internal combustion engine with a control device,
FIG. 2 a block diagram of parts of the control device and
FIG. 3 signal characteristics.

According to various embodiments, in a method and a corresponding device for operating an internal combustion engine comprising a catalytic converter, a first exhaust gas sensor may be disposed in such a way that it may be used in a lambda closed-loop control operation, i.e. in particular upstream of or inside the catalytic converter, and a second exhaust gas sensor may be disposed in such a way that it may be used in a trim closed-loop control operation, i.e. in particular downstream of the catalytic converter or optionally also still inside the catalytic converter but at any rate downstream of the first exhaust gas sensor.

An HC quality value that is representative of an oxygen storage capacity of the catalytic converter is determined in dependence upon a measuring signal of the second exhaust gas sensor. A NOx correction value is determined in dependence upon the measuring signal of the second exhaust gas sensor, namely in dependence upon signal components that are representative of the presence of residual oxygen. A NOx quality value is determined in dependence upon the HC quality value and the NOx correction value. In this way use is made of the knowledge that the HC quality value has a specific correlation with regard to the NOx quality value and hence with the NOx emissions. Use is further made of the knowledge that by taking the NOx correction value into account the NOx quality value may be determined with even greater accuracy and so a clearer identification of NOx emissions is possible.

This has the further advantage of making it possible to dispense with the use of additional sensors. In this way, in particular cold-start emissions, which substantially comprise hydrocarbon emissions, and hot emissions, which substantially comprise nitrous oxides, are evaluated separately.

It may be particularly advantageous if in dependence upon the NOx quality value and a defined NOx quality limit-value a diagnosis indicator is determined and so a diagnosis in respect of NOx emissions downstream of the catalytic converter is easily possible.

An internal combustion engine has an intake tract 1, an engine block 2, a cylinder head 3 and an exhaust tract 4. The intake tract 1 preferably comprises a throttle valve 5, a collector 6 and an intake manifold 7. The intake manifold 7 opens out into an inlet channel that extends in the direction of a cylinder Z1 in the engine block 2. The engine block 2 further comprises a crankshaft 8, which is coupled by a connecting rod 10 to a piston 11 of the cylinder Z1.

The cylinder head comprises a valve operating mechanism with a gas inlet valve 12 and a gas outlet valve 13. The cylinder head 3 further comprises an injection valve 18 and a spark plug 19. Alternatively, the injection valve 18 may be disposed in the intake manifold 7.

Disposed in the exhaust tract 4 is a catalytic converter 21, which preferably takes the form of a three-way catalytic converter. There may be additionally disposed in the exhaust tract a further catalytic converter 23, which may for example also be a special NOx catalytic converter.

The internal combustion engine further comprises a control device 25, which may also be described as a device for operating the internal combustion engine. Associated with the control device 25 are sensors that acquire various measured variables. Operating variables comprise, in addition to the measured variables, also variables that are derived therefrom.

There are moreover associated with the control device actuators that act upon final control elements of the internal combustion engine.

The control device is designed to determine, in dependence upon at least one of the operating variables, manipulated variables that are then converted into one or more actuating signals for controlling the final control elements by means of corresponding actuators. The control device comprises a memory unit for storing data and programs as well as an arithmetic logic unit for executing stored programs. The control device moreover comprises a driver unit for generating corresponding actuating signals.

The sensors take the form of pedal position sensors 26 that detect an accelerator pedal position of an accelerator pedal 27, an air-mass sensor 28 that is disposed upstream of the throttle valve 5 and detects the air-mass flow there, a temperature sensor 32 that detects an intake air temperature, an intake manifold pressure sensor 34 that acquires an intake manifold pressure, a crankshaft angle sensor 36 that acquires a crankshaft angle, with which a rotational speed N of the internal combustion engine is associated.

The sensors also further comprise a first exhaust gas sensor 42, which is disposed in such a way that it may be used in a lambda closed-loop control operation. The first exhaust gas sensor 42 is preferably disposed upstream of the catalytic converter 21 in the exhaust tract 4. It may however alternatively be disposed in the catalytic converter 21. The first exhaust gas sensor 42 is designed to detect a residual oxygen content of the exhaust gas. Its measuring signal VLS_UP is therefore characteristic of the air-fuel ratio in the combustion chamber of the cylinder Z1 and upstream of the exhaust gas sensor 42 prior to oxidation of the fuel. The first exhaust gas sensor 42 preferably takes the form of a linear lambda sensor. An exemplary development of such a linear lambda sensor is disclosed for example on page 589 of the "Internal Combustion Engine Manual" already cited in the introduction, the content of which manual is hereby included in this regard.

A second exhaust gas sensor 43 is further provided, which is disposed in such a way that it may be used in a trim closed-loop control operation. The second exhaust gas sensor 43 preferably takes the form of a binary lambda sensor, which is also known as a discrete-level sensor. The second exhaust gas sensor 43 is preferably disposed downstream of the catalytic converter 21. It may however alternatively be disposed inside the catalytic converter 21. In this case, however, it is at any rate disposed downstream of the first exhaust gas sensor 42.

The measuring signal VLS_DOWN of the second exhaust gas sensor 43 is characteristic of a residual oxygen content of the exhaust gas in the region of the second exhaust gas sensor 43.

The said sensors or alternatively a subset of these or alternatively additional sensors may be associated with the control device 25.

Final control elements are for example the throttle valve 5, the gas inlet- and gas outlet valves 12, 13, the injection valve 18 or the spark plug 19.

Preferably, besides the cylinder Z1, further cylinders Z2 to Z4 are additionally provided, with which corresponding final control elements and optionally sensors are likewise associated.

Figure 2:
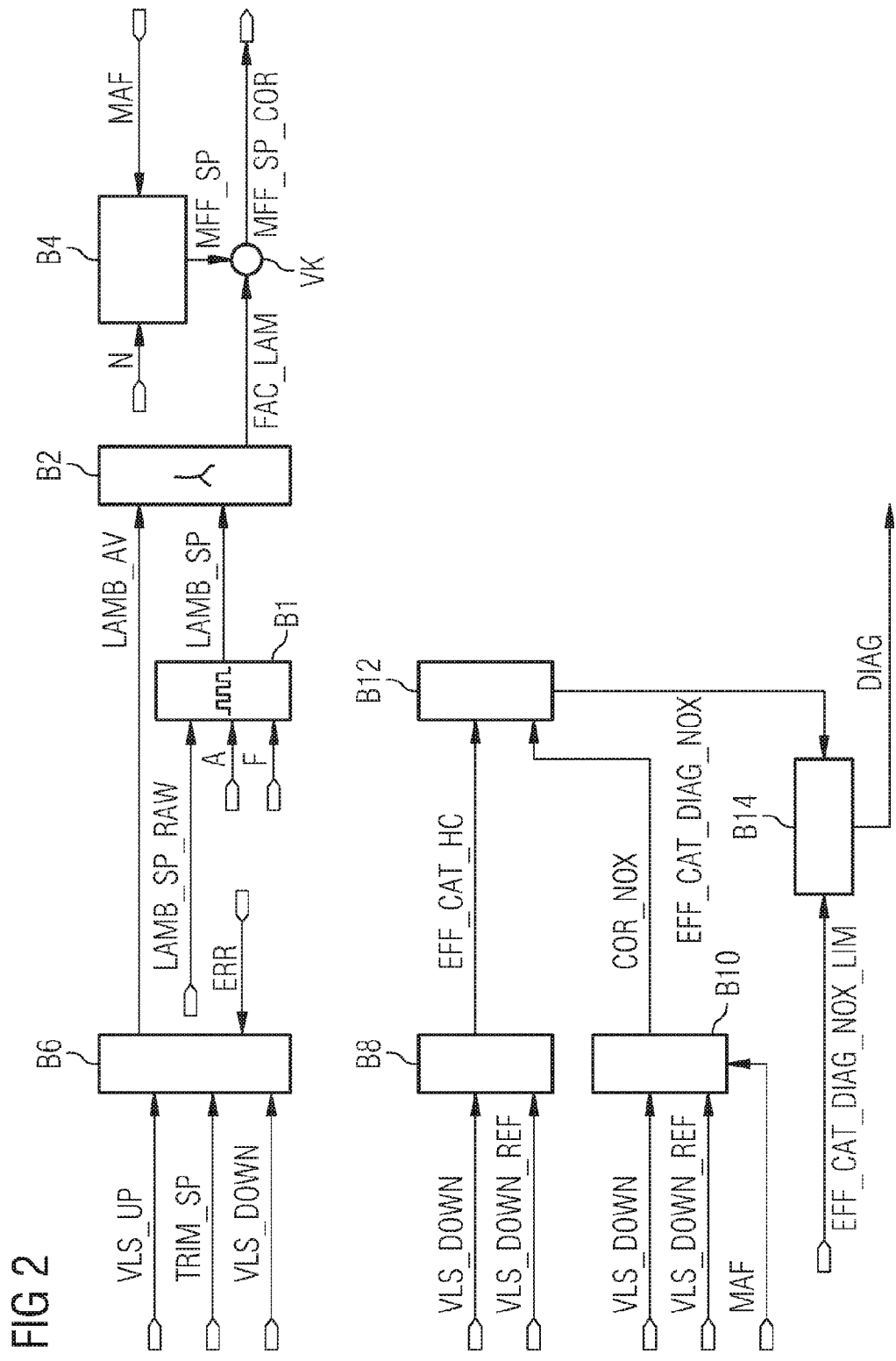

There now follows a detailed description of parts of the control device 25 with reference to the block diagram of FIG. 2. The block diagram comprises blocks B1 to B14, which are also known as function blocks and the functionality of which is preferably stored in the form of programs in the control device and which are then preferably executed during operation of the internal combustion engine.

There is supplied to the input side of a block B1 a basic setpoint value LAMB_SP_RAW of the air-fuel ratio that may be defined by a further non-illustrated function or alternatively may in principle be predefined. The basic setpoint value LAMB_SP_RAW of the air-fuel ratio preferably has a value that lies close to the stoichiometric air-fuel mixture.

There is moreover supplied to the block B1 a forced excitation amplitude A and a forced excitation frequency F. In dependence upon the forced excitation amplitude A and the forced excitation frequency F a forced excitation is modulated upon the basic setpoint value LAMB_SP_RAW of the air-fuel ratio in the block B1 in order to adjust a lambda variation for optimizing the catalytic converter efficiency of the catalytic converter 21. At the output side of the block B1 the setpoint value LAMB_SP of the air-fuel ratio subjected to corresponding forced excitation is output and supplied to the input side of the block B2.

The block B2 comprises a lambda controller, which preferably takes the form of a linear lambda controller and is preferably designed as a PII$^2$D controller. Such a linear lambda controller is disclosed in the context of a lambda closed-loop control operation in the "Internal Combustion Engine Manual" already cited in the introduction on pages 559-561, the content of which pages is hereby included in this respect.

At the output side of the block B2 a lambda correction value FAC_LAM is then generated by the lambda controller. In a block B4 a fuel mass to be metered MFF_SP is determined in dependence upon a load to be adjusted. This is effected preferably in dependence upon the rotational speed N and the air-mass flow MAF flowing into the respective combustion chamber of the respective cylinders Z1 to Z4.

At a combinational logic point VK the fuel mass to be metered MFF_SP is combined with the lambda correction value FAC_LAM into a corrected fuel mass to be metered MFF_SP_COR, which is then converted into a corresponding actuating signal for driving a respective injection valve 18.

A block B6 comprises a trim controller. The measuring signal VLS_DOWN of the second exhaust gas sensor 43 and a trim setpoint value TRIM_SP are supplied to the block B6.

The trim setpoint value TRIM_SP is preferably preselected and dependent upon the specific design of the second exhaust gas sensor 43.

It may for example have a value of between 650 and 700 mV. The trim controller preferably comprises a P-, a D- and optionally an I component. The system deviation of the trim controller is preferably dependent upon the trim setpoint value TRIM_SP and the measuring signal VLS_DOWN of the second exhaust gas sensor 43. Optionally, prior to generation of the system deviation the measuring signal VLS_DOWN of the second exhaust gas sensor 43 is also additionally filtered.

In dependence upon the actuating signal component formed by the I-component of the trim controller it is for example also possible additionally to determine an adaptation value, for example from a mean actuating signal component of the I component over a preselected period of time. The actuating signal of the trim controller is preferably effective in the form of a characteristic shift of a characteristic, by means of which an assignment of the measuring signal VLS_UP of the first exhaust gas sensor 42 to the actual value LAMB_AV of the air-fuel ratio is effected. The trim controller therefore in particular enables a compensation of a variation of the characteristic of the first exhaust gas sensor 42 over operation of the internal combustion engine.

A block B8 is designed to determine an HC quality value EFF_CAT_HC in dependence upon the measuring signal VLS_DOWN of the second exhaust gas sensor 43 and a reference value VLS_DOWN_REF of the measuring signal of the second exhaust gas sensor 43. This is realized preferably in the form of a check of the oxygen storage capacity of the catalytic converter 42. For this purpose, preferably in preselected operating states, in particular in a quasi-stationary operating state, the forced excitation amplitude A is increased compared to normal operation and over a preselected number of cycles of the forced excitation, for example approximately 20 cycles, in dependence upon an amplitude— correlating therewith—of an oscillation of the measuring signal VLS_DOWN of the second exhaust gas sensor 43 in relation to the reference value VLS_DOWN_REF of the measuring signal of the second exhaust gas sensor 43 the HC quality value EFF_CAT_HC is determined. Here, use is made of the knowledge that the amplitude of this oscillation is all the lower, the higher the oxygen storage capacity of the catalytic converter 42 is. In particular this allows very accurate analysis of the surface oxygen storage performance of the catalytic converter, which is representative of the capacity to convert HC emissions inside the catalytic converter 42.

Alternatively, the HC quality value EFF_CAT_HC may be determined in some other way, such as for example by means of a corresponding oxygen balance calculation in dependence upon the measuring signal of the first exhaust gas sensor 42 VLS_UP and the second measuring signal VLS_DOWN of the second exhaust gas sensor 43.

A block B10 is designed to determine a NOx correction value COR_NOX. This is effected in dependence upon the measuring signal VLS_DOWN of the second exhaust gas sensor 43, the reference value VLS_DOWN_REF of the measuring signal of the second exhaust gas sensor 43 and the air-mass flow MAF. The procedure for determining the NOx correction value COR_NOX is described in detail below with reference to the signal characteristics according to FIG. 3.

FIG. 3 shows the exemplary signal characteristic of the measuring signal VLS_DOWN of the second exhaust gas sensor 43 over the time T. The second exhaust gas sensor 43 in this exemplary embodiment is designed in such a way that its measuring signal VLS_DOWN has a lower voltage value than the reference value VLS_DOWN_REF in the event of the presence of a residual oxygen content in the region of the second exhaust gas sensor 43, while it has a higher voltage value than the reference value VLS_DOWN_REF in the event of a corresponding absence of a residual oxygen content.

By way of example a first and second threshold value VLS_DOWN_THD_1, VLS_DOWN_THD_2 are defined, to which NOx factors FAC_NOx, namely first and second NOx factor values FAC_NOx_1, FAC_NOx_2, are then assigned. In a preferred manner these are predefined and determined for example by means of appropriate experiments or simulation. Preferably, the respective value of the air-mass flow MAF and the NOx factor that has just been assigned are combined with one another and this product is then integrated. This produces the characteristic of a NOx integral NOx_INT that is represented in the bottom part of FIG. 3. In this case, t_1 to t_6 denote corresponding instants of time. The determination of the NOx integral NOx_INT is carried out preferably in preselected driving situations, for example in a constant velocity phase with a high engine load or alternatively in acceleration phases.

In dependence upon the NOx integral NOx_INT the NOx correction value COR_NOX is then determined. This may be effected if a preselected condition is met, which is related for example to the duration of the integration operation.

The NOx correction value COR_NOX is an input variable for a block B12, to which the HC quality value EFF_CAT_HC is likewise supplied. In the block B12, in dependence upon the HC quality value EFF_CAT_HC and the NOx correction value COR_NOX a NOx quality value EFF_CAT_DIAG_NOX is determined. This is realized preferably by means of a multiplicative operation. It may however also be effected for example by means of an additive operation.

In a block B14 there is preferably effected a comparison of the NOx quality value EFF_CAT_DIAG_NOX with a NOx quality limit value EFF_CAT_DIAG_NOX_LIM, which is preferably predefined and corresponds for example to the performance of a so-called limit catalytic converter, i.e. a catalytic converter that just observes preselected exhaust gas values. Depending on the comparison result, there is then determined a diagnosis indicator DIAG with a correspondingly characteristic value, which depending on the outcome of the comparison is characteristic of a fault, in particular because of too high NOx emissions, or of no fault.

Depending on the value of the diagnosis indicator DIAG a fault display, also known as a malfunction indicator lamp (MIL), may for example then be correspondingly activated and a corresponding fault entry in the memory of the control device 25 may be effected.

What is claimed is:

1. A method of operating an internal combustion engine comprising a catalytic converter, a first exhaust gas sensor that is disposed in such a way that it may be used in a lambda closed-loop control operation, and a second exhaust gas sensor that is disposed in such a way that it may be used in a trim closed-loop control operation, the method comprising the steps of:

modulating a forced excitation upon an air-fuel ratio setpoint value in order to adjust a lambda variation for optimizing an efficiency of the catalytic converter, using a second exhaust gas sensor to generate a measuring signal responsive to a controlled air-fuel ratio of the internal combustion engine, a controller determining an HC quality value that is representative of an oxygen storage capacity of the catalytic converter by:

increasing the forced excitation amplitude applied to the air-fuel ratio setpoint value, comparing an oscillation of the measuring signal generated by the second exhaust gas sensor with respect to a predefined reference value for the measuring signal, and determining the HC quality value based on the results of the comparison, the controller determining a NOx correction value by:

comparing the measuring signal generated by the second exhaust gas sensor to one or more threshold values, each having a predetermined factor assigned thereto, determining durations during which the measuring signal crosses each of the one or more threshold values, for each determined duration, calculating a product of a determined air mass flow for the internal combustion engine and the factor assigned to the threshold value crossed during that duration, and summing the calculated products for the durations, the controller multiplying or adding the HC quality value and the NOx correction value to determine an NOx quality value representing a level of current NOx emissions from the engine.

2. The method according to claim 1, comprising comparing the NOx quality value with a preselected NOx quality limit value, and generating a fault indicator if the NOx quality value exceeds the preselected NOx quality limit value.

3. The method according to claim 1, wherein the NOx correction value is determined in dependence upon signal components that are representative of the presence of residual oxygen.

4. The method according to claim 1, wherein the HC quality value is determined by increasing the forced excitation amplitude and over a preselected number of cycles of the forced excitation, determining the HC quality value in dependence upon an amplitude of an oscillation of the measuring signal of the second exhaust gas sensor in relation to a reference value of the measuring signal of the second exhaust gas sensor.

5. The method according to claim 4, wherein the preselected number of cycles is approximately 20 cycles.

6. The method according to claim 1, wherein the HC quality value is determined by means of a corresponding oxygen balance calculation in dependence upon the measuring signal of the first exhaust gas sensor and the second measuring signal of the second exhaust gas sensor.

7. An electronic control device for of an internal combustion engine comprising a catalytic converter, a first exhaust gas sensor that is disposed in such a way that it may be used in a lambda closed-loop control operation, and a second exhaust gas sensor that is disposed in such a way that it may be used in a trim closed-loop control operation, the electronic control device being communicatively coupled to the first and second exhaust sensors, the electronic control device comprising:

a memory storing data and programs, the programs when executed:

determines an HC quality value, which is representative of an oxygen storage capacity of the catalytic converter, in dependence upon a measuring signal of the second exhaust gas sensor, determines a NOx correction value by:

comparing the measuring signal to one or more threshold values, each having a predetermined factor assigned thereto, determining durations during which the measuring signal crosses each of the one or more threshold values, for each determined duration, calculating a product of a determined air mass flow for the internal combustion engine and the factor assigned to the threshold value crossed during that duration, and summing the calculated products for the durations, and multiplies or adds the HC quality value and the NOx correction value to determine a NOx quality value.

8. The device according to claim 7, further being operable to compare the NOx quality value with a preselected NOx quality limit value, and generate a fault indicator if the NOx quality value exceeds the preselected NOx quality limit value.

9. A system for operating an internal combustion engine comprising:

a catalytic converter, a control device, a first exhaust gas sensor that is disposed in such a way that it may be used in a lambda closed-loop control operation, and a second exhaust gas sensor that is disposed in such a way that it may he used in a trim closed-loop control operation, wherein the second exhaust gas sensor feeds a measuring signal to the control device which:

determines an HC quality value that is representative of an oxygen storage capacity of the catalytic converter from the measuring signal by:

increasing a forced excitation amplitude applied to an air-fuel ratio setpoint value, comparing an oscillation of the measuring signal generated by the second exhaust gas sensor with respect to a predefined reference value, and determining the HC quality value based on the results of the comparison, determines an NOx correction value by:

comparing the measuring signal generated by the second exhaust gas sensor to one or more threshold values, each having a predetermined factor assigned thereto, determining durations during which the measuring signal crosses each of the one or more threshold values, for each determined duration, calculating a product of a determined air mass flow for the internal combustion engine and the factor assigned to the threshold value crossed during that duration, and summing the calculated products for the durations, multiplies or adds the HC quality value and the NOx correction value to determine an NOx quality value representing a level of current NOx emissions from the engine.

10. The system according to claim 9, wherein the control device further compares the NOx quality value with a preselected NOx quality limit value, and generates a fault indicator if the NOx quality value exceeds the preselected NOx quality limit value.

11. The system according to claim 9, wherein the control device comprises a plurality of functional blocks.

12. The system according to claim 11, wherein a functionality of each block is stored in the form of programs which are executed during operation of the internal combustion engine.

13. The system according to claim 9, wherein the control device modulates a forced excitation upon a basic setpoint value of an air-fuel ratio in order to adjust a lambda variation for optimizing an efficiency of the catalytic converter.

14. The system according to claim 13, wherein the control device determines the HC quality value by increasing the forced excitation amplitude and over a preselected number of cycles of the forced excitation, determining the HC quality value in dependence upon an amplitude of an oscillation of the measuring signal of the second exhaust gas sensor in relation to a reference value of the measuring signal of the second exhaust gas sensor.

15. The system according to claim 14, wherein the preselected number of cycles is approximately 20 cycles.

16. The system according to claim 9, wherein the control device determines the HC quality value by means of a corresponding oxygen balance calculation in dependence upon the measuring signal of the first exhaust gas sensor and the second measuring signal of the second exhaust gas sensor.

* * * * *